UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

BLUE DYE.

SPECIFICATION forming part of Letters Patent No. 557,435, dated March 31, 1896.

Application filed September 5, 1895. Serial No. 561,571. (Specimens.)

*To all whom it may concern:*

Be it known that I, JAKOB SCHMID, a citizen of Switzerland, residing at Basle, Switzerland, have invented new and useful Improvements in the Production of Blue Polyazo Dyes or Coloring-Matters, of which the following is a specification.

My invention relates to the production of new blue polyazo dyes, which produce blue tints on unmordanted cotton in an alkaline or neutral bath, having the characteristics of being developed to black by rediazotizing on the fiber and by combining with amins, amidophenols, or phenols.

The new dyestuffs are produced by the action of 1.8 amidonaphthol, 3.6 disulfonate of soda upon the new tetrazo compounds, being obtained by coupling together two molecules of tetrazo bodies derived from benzidin and the analogous bodies, such as tolidin, diamidostilbene, diamidodiphenol ethers, diamidoethoxydiphenyl with one molecular proportion of 1.8 amidonaphthol, 3.6 disulfonate of soda, or 1.8 dioxynaphthalene, 3.6 disulfonate of soda. The dyestuffs thus obtained correspond to the general formula:

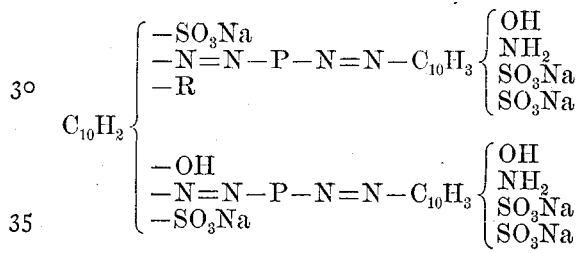

where R represents $NH_2$ or OH, and P the radicle of benzidin and its analogues.

The following examples will sufficiently show how my invention can be practically carried out:

Example I. 18.4 kilos of benzidin are diazotized and combined in an alkaline solution with eighteen kilos of 1.8 amidonaphthol or 1.8 dioxynaphthalene, 3.6 disulfonate of soda. After a short time a difficultly soluble precipitate of the intermediate product of a black hue is formed, containing two free diazo groups, which are capable of being combined with two molecular proportions of 1.8 amidonaphthol, 3.6 disulfonic acid, or one molecular proportion of this acid and one molecular proportion of another component, such as amidonaphtholsulfo-acid G or 1.4 naphtholmonosulphonic acid. For this purpose the intermediate product is introduced into an alkaline solution of thirty-six kilos of 1.8 amidonaphtholsulfonate of soda. The new dyestuff is formed after twelve hours rest, and it is isolated in the usual way by salting-out, filtering, and drying. It dyes blue shades on unmordanted cotton. Similar coloring-matters may be obtained from mixed intermediate products.

Example II. 11.6 kilos of tolidin are diazotized and first combined with eighteen kilos of 1.8 amidonaphthol, 3.6 disulfonate of soda in an acid solution. Hereupon 9.2 kilos of diazotized benzidin in alkaline solution are added. After standing for about three hours the mixed intermediate product (insoluble in water) is introduced into a solution of thirty-six kilos of 1.8 amidonaphthol, 3.6 disulfonate of soda.

The herein-described new dyestuffs form black powders of metallic luster, soluble in water with a blue, in concentrated sulfuric acid with a green-blue coloration, from which solution the free-color acid is precipitated by addition of water. They are insoluble in alcohol, ether, and benzene, and dye blue tints of a pure blue shade on unmordanted cotton.

What I claim as new, and desire to secure by Letters Patent, is—

The blue polyazo dyes which have the general formula:

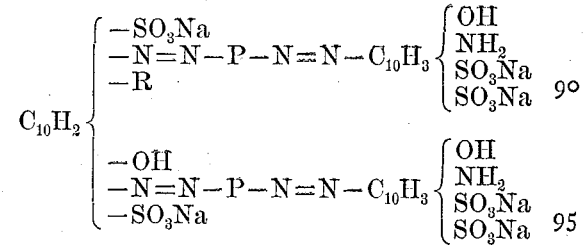

and which form black powders with a metallic luster soluble in water with a blue and in concentrated sulfuric acid with a green blue coloration from which solution the free color acid is precipitated by addition of water; are insoluble in alcohol, ether and benzene and dye on unmordanted cotton blue tints of quite a pure shade, substantially as described.

In testimony whereof I have hereunto set my hand in the presence of two subscribing witnesses.

JAKOB SCHMID.

Witnesses:
 GEORGE GIFFORD,
 FRITZ WALTERS.